Jan. 23, 1951      A. R. METZLER      2,539,372
METHOD OF SEVERING TUBES OF RESILIENT MATERIAL
Filed Sept. 7, 1949
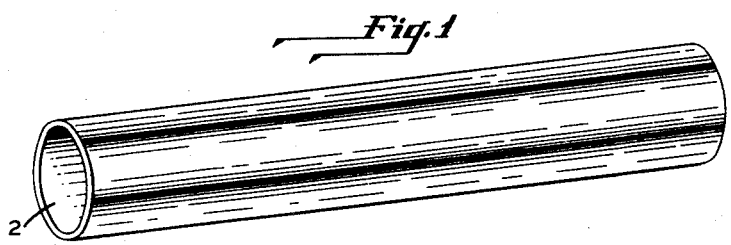
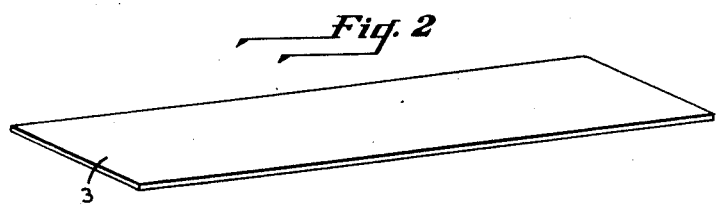
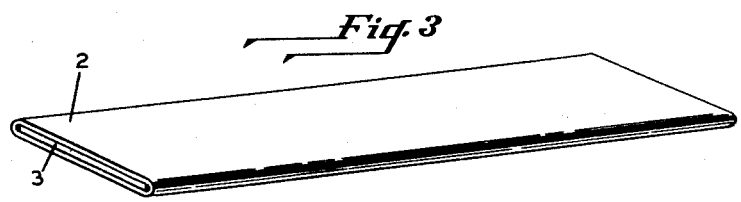
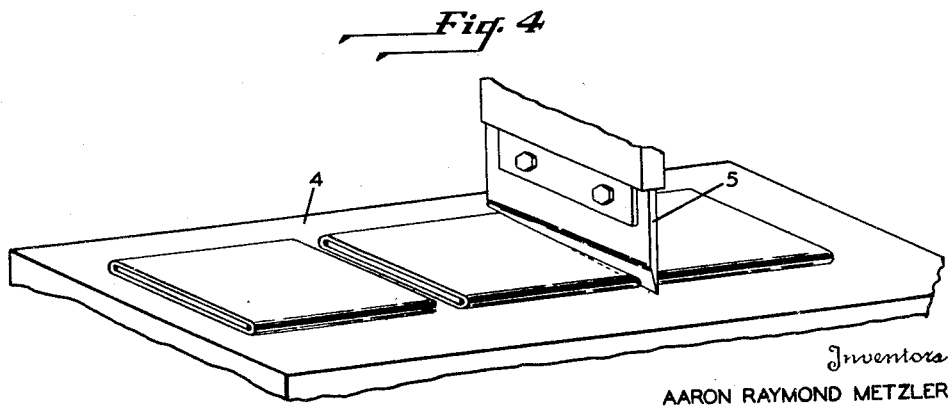
Inventor
AARON RAYMOND METZLER
by
Walter F Kaufman
Attorney Patented Jan. 23, 1951

2,539,372

UNITED STATES PATENT OFFICE 2,539,372

METHOD OF SEVERING TUBES OF RESILIENT MATERIAL

Aaron Raymond Metzler, Randolph, Mass., assignor to Armstrong Cork Company, Lancaster, Pa., a corporation of Pennsylvania Application September 7, 1949, Serial No. 114,409

6 Claims. (Cl. 164—17)

This invention relates to a method of severing tubes of resilient material such as tubes of resilient rubber composition into pieces of a desired length, with clean, sharp-cut edges. The invention is particularly useful in the severance of tubes of textile fiber drafting apron stock into long draft aprons. The invention will be useful generally, however, in many arts.

Long draft aprons are fabricated on cylindrical mandrels and are generally formed in sections 18" in length and of various diameters. Diameters of about 1" to 4½" are most common on aprons for Saco-Lowell and Whiten type drafting frames. The aprons generally include an inner layer of flexible synthetic rubber composition, a helically disposed reinforcing cord embedded in the inner layer and an outer wearing layer of resilient synthetic rubber composition. The various layers are vulcanized together under pressure on the forming mandrel, and the outer surface of the stock is buffed after curing has been completed on the forming mandrel. The stock is then removed from the mandrel and it is subsequently cut into aprons of various widths. These aprons generally run from about 1" to 4" wide.

Apron stock with its cord reinforcing is resilient, but it does possess some rigidity in the sense that when a tube of the stock is placed upon a flat surface the tube will not collapse into a flat body but will deform somewhat, the extent of deformation depending upon the diameter of the tube, the thickness of the stock, its hardness, and other variable factors. As a result, guillotine cutting in the normal manner will produce a cut edge which is not always true throughout the extent of the cut, having slight irregularities, particularly at diametrically opposite points on the severed apron where the tube is distorted by the knife in first pressing the tube into a flat condition and then severing it. Where the wall thickness is relatively thin, there is some tendency for wrinkling to occur, and this results in an uneven cut. Also, the tubes being nonrigid are difficult to handle.

Similar problems are involved in the formation of rubber rings for use in the manufacture of so-called side seal closures. In the fabrication of these closure rings from tubed rubber stock, guillotine cutting is frequently employed and severance of the stock into rings of uniform size, free of irregularities, is difficult. Problems of a similar nature are encountered in the formation of rubber bands and the like.

An object of the invention is to provide a method of cutting resilient tube stock which will result in clean, sharp edges.

Another object of the invention is to provide a method of cutting tube stock which will be more expeditious and convenient than processes commonly employed.

Other objects of the invention will be apparent from the following more specific description of the invention.

According to the invention, the tube stock to be severed is collapsed and held in a substantially flat condition by the insertion of a strip of rigid material within the tube to be severed. The insert is preferably formed of cardboard or other material which may be readily severed and which is preferably inexpensive and expendable. The tube stock with its insert is rigid and may be conveniently handled. The composite tube stock and insert are severed, preferably with a guillotine cutter.

A preferred embodiment of the invention is illustrated in the accompanying drawing in which:

Figure 1 is a perspective view showing a section of tube stock to be severed;

Figure 2 is a similar view showing an insert in the nature of a piece of flat sheet cardboard;

Figure 3 is a view similar to Figures 1 and 2 showing the insert of Figure 2 disposed within the tube of Figure 1; and Figure 4 is a perspective view illustrating the severance of the composite tube stock and insert of Figure 3, with a conventional guillotine cutter diagrammatically shown.

Figure 1 shows a length of tube stock 2 which may, for purposes of illustration, be considered to be 18" long and having an inside diameter of 2". The tube section 2 may be a section of cord reinforced long draft apron stock having a composite structure of the type described above.

Figure 2 shows an insert 3 which may be of paper board or cardboard about $\frac{1}{16}$" to $\frac{1}{8}$" thick, 18" long, and about 3" wide. The insert stock is relatively inexpensive and possesses adequate rigidity for the purpose of holding the tube 2 in a collapsed condition as illustrated in Figure 3 where the insert 3 has been disposed within the tube 2, collapsing the tube into a substantially flat condition. The width of the insert 3 should be sufficiently greater than the diameter of the tube 2 to effect proper collapsing of the tube for severance with a sharp, clean cut. The width of the insert will depend upon its thickness. As the thickness of the insert is increased, its width must be decreased. Theoretically, substantially complete collapse of a tube will be effected by insertion of a piece of insert stock, the combined width and thickness of which is equal to one-half the inside circumference of the tube. With a thin-walled tube stock of an elastic nature without cord or similar reinforcing, the width plus the thickness of the insert 3 may be slightly greater than one-half of the circumference of the inner surface of the tube stock 2, requiring that the tube stock be stretched slightly over the insert. Extensive stretching is not desirable; and for convenience in insertion, it is preferred to have the insert 3 of a width plus thickness slightly less than one-half of the inner circumference of the tube stock 2. This will assure easy insertion and will at the same time provide for complete collapsing of the tube stock. For economy it is preferred to use a relatively thin insert, of sufficient thickness, however, to permit ready insertion and at the same time provide adequate rigidity for easy handling and proper support of the tube in collapsed condition against its inherent tendency to assume a more or less cylindrical shape.

The collapsed tube stock 2 with the insert 3 therein is then positioned upon a table 4 and a guillotine cutter 5 is brought down from above and severs both the tube stock and the insert into sections of the desired length.

For convenience in handling and shipping, the tube stock may be permitted in some instances to remain on the insert, the insert to be removed at the mill when it is desired to assemble the apron on the machine. Where it is desired to place a trademark or other indicia on the surface of the apron, this may be accomplished with the stock in flattened condition; and since it is desired generally to apply the trademark or other marking in the center of the apron, it is preferred to apply the marking subsequent to severance of the tube stock, although the flat stock may be suitably marked prior to severance. Marking is facilitated by having the stock in a flattened condition, particularly where manual marking, as by use of a rubber stamp, is employed.

While I have illustrated and described a preferred embodiment of the invention, it will be understood that the same it not limited thereto but may be otherwise embodied and practiced within the scope of the following claims.

I claim:

1. In a method of severing tubes of resilient material, the steps comprising inserting within the tube to be severed a sheet of rigid readily severable material, the width of which is sufficiently greater than the diameter of said tube to cause said tube to assume a substantially flat condition, and severing said tube and sheet simultaneously to cut said tube into sections of desired length.

2. In a method of severing cylindrical tubes of resilient material, the steps comprising inserting into a tube to be severed a flat sheet of rigid readily severable material, the width plus the thickness of which sheet is equal to approximately one-half of the circumference of the inner surface of said tube to cause said tube to assume a substantially flat condition, positioning said flattened tube upon a substantially flat support, and bringing a cutting edge from above into and through said tube and flat sheet to sever said tube and sheet.

3. In a method of severing cylindrical tubes of resilient material, the steps comprising collapsing the tube into a substantially flat condition by insertion thereinto of a sheet of rigid readily severable sheet material capable of holding said tube in collapsed and flattened condition and thereafter severing said tube and inserted sheet.

4. In a method of severing cylindrical tubes of resilient material of a semi-rigid nature, such as cord reinforced tubular long draft apron stock, the steps comprising disposing within the tube an insert of paper board stock which is relatively thin but rigid and of a width and length sufficient when inserted to collapse said tube into a substantially flat condition and severing said tube and insert simultaneously to secure a cut edge which is straight and true throughout its extent.

5. In a method of severing cylindrical tubes of resilient material of a semi-rigid nature, the steps comprising inserting in the tube a piece of cardboard approximately $\frac{1}{16}''$ to $\frac{1}{8}''$ thick and of a width sufficient to completely collapse said tube into a flattened condition free of wrinkles and thereafter severing said tube and cardboard layer.

6. In a method of severing tubes of elastic material, the steps comprising inserting into the tube a flat piece of rigid sheet material, the width plus the thickness of which is slightly greater than one-half the circumference of the inner surface of the tube, whereby the tube is stretched over the insert and is in a flattened condition, and severing said tube and insert by pressing a cutting edge through the tube and insert.

AARON RAYMOND METZLER.

No references cited.